United States Patent [19]

Ito

[11] 4,133,091

[45] Jan. 9, 1979

[54] APPARATUS FOR FIXING BLADES ON TURBINE WHEEL FOR FLUID COUPLING MADE OF SHEET METAL

[75] Inventor: Hiroshi Ito, Kawagoe, Japan

[73] Assignee: Honda Giken Kogyo Kabushiki Kaisha, Japan

[21] Appl. No.: 786,143

[22] Filed: Apr. 11, 1977

[30] Foreign Application Priority Data

Apr. 12, 1976 [JP] Japan ............................ 51-41142

[51] Int. Cl.² ................... B23P 19/04; B23P 23/00; B23P 11/00
[52] U.S. Cl. ........................ 29/33 K; 29/156.8 FC; 29/243.5; 29/509; 29/514; 72/382; 72/414
[58] Field of Search ............ 29/156.8 FC, 156.8 CF, 29/156.8 R, 23.5, 243.5, 33 R, 509, 515, 33 K; 72/412, 414, 382, 397

[56] References Cited

U.S. PATENT DOCUMENTS

| | | | |
|---|---|---|---|
| 266,653 | 10/1882 | Spaulding | 72/412 |
| 594,960 | 12/1897 | McAusland | 72/414 |
| 1,546,656 | 7/1925 | Hansen et al. | 72/414 |
| 2,505,820 | 5/1950 | Zeidler | 29/156.8 FC |
| 2,660,970 | 12/1953 | Koskinen | 29/156.8 FC |
| 2,692,562 | 10/1954 | Zeidler | 29/156.8 FC |
| 2,745,354 | 5/1956 | English et al. | 29/156.8 FC |
| 2,771,851 | 11/1956 | McGregor | 72/397 |
| 3,017,966 | 1/1962 | Betz | 29/509 |
| 3,113,083 | 12/1963 | Silvester | 29/509 |
| 3,137,915 | 6/1964 | Smirl | 29/156.8 FC |

Primary Examiner—C.W. Lanham
Assistant Examiner—Daniel C. Crane
Attorney, Agent, or Firm—Polster, Polster and Lucchesi

[57] ABSTRACT

Proposed in this specification is a method for fixing a multitude of blades or vanes onto inner concaved surface of an outer shell of a turbine wheel for a fluid or hydrodynamic coupling made by sheet metal stamping, in which a plurality of slots, each having a size sufficient to receive in it a projected part of each blade, are formed by means of an array of punches held on a die in the inner concaved surface of the outer shell of the turbine wheel at an equal space interval provided between adjacent slots, and in an arrangement of a plurality of concentric rings, then the projections provided on each blade are fitted into the slots in a manner to cause the blade to extend in the radial direction from the center of the concentric rings of the arrays of the slots, and finally one of the edge portion of each slot is staked or caulked by means of the array of punches which have been shifted for a thickness of the blade so as to cause one of the side surfaces of each of the projections on each blade to be urged to the inner surface of the slot opposite to the staked inner surface thereof.

Also proposed is an apparatus for fixing such blades which is constructed with a die to hold the outer shell of the turbine wheel with its inner peripheral surface being faced upward, and at least a single ring shaped punch array consisting of a plurality of punches, which are provided on the die in a vertically movable manner.

2 Claims, 19 Drawing Figures

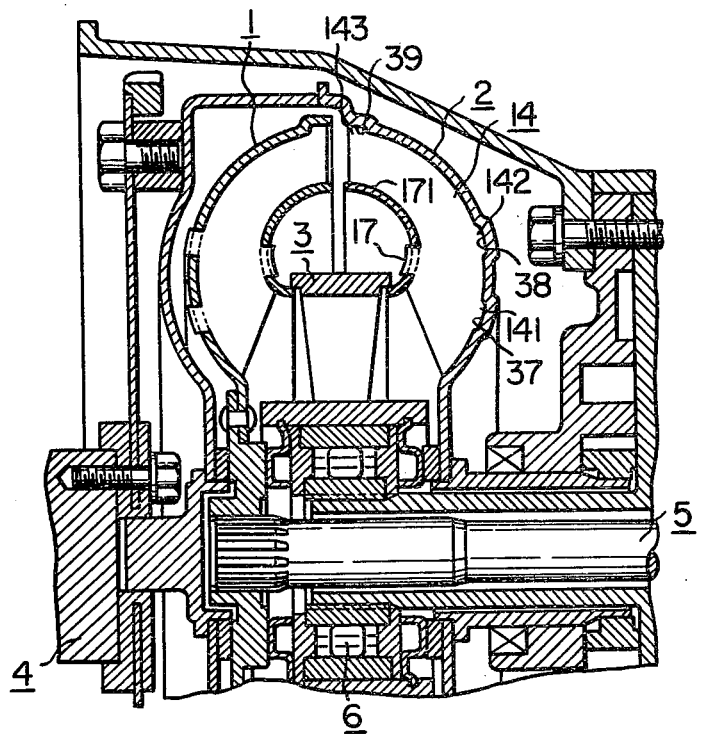
FIG.1
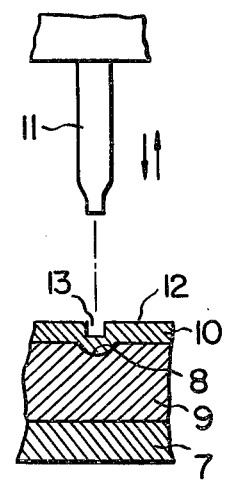
FIG.2
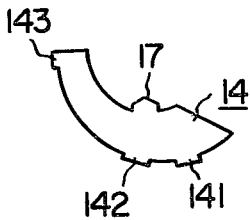
FIG.3
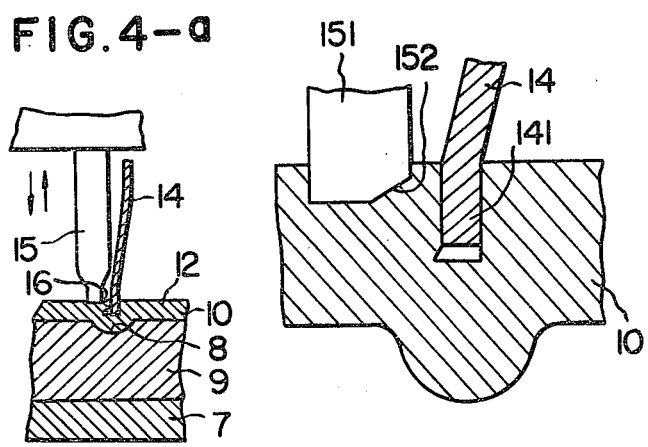
FIG.4-a FIG.4-b

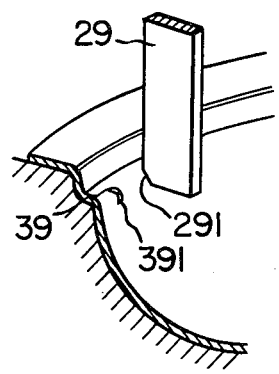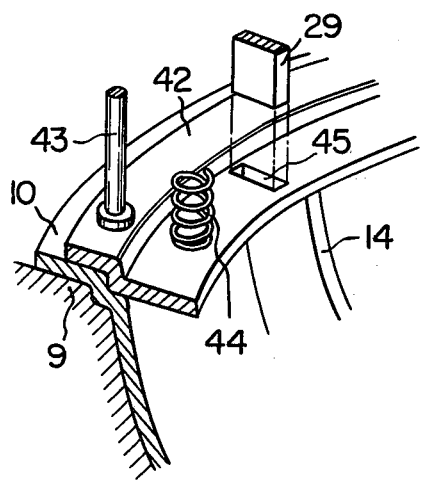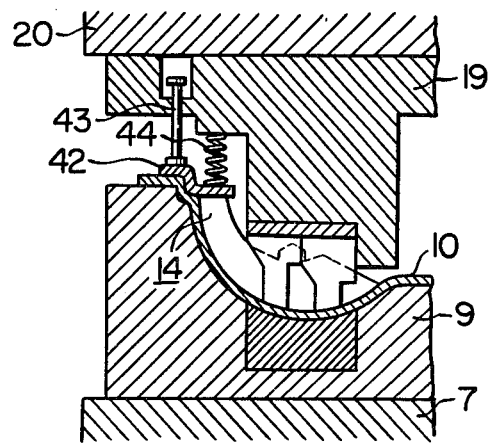

APPARATUS FOR FIXING BLADES ON TURBINE WHEEL FOR FLUID COUPLING MADE OF SHEET METAL

BACKGROUND OF THE INVENTION

This invention relates to a fluid or hydrodynamic coupling, and more particularly, it is concerned with a method and apparatus for fitting a multitude of blades to the inner surface of the outer shell of a turbine wheel for the fluid coupling made of sheet metal stamping.

The fluid coupling has, as its component elements, a turbine wheel, a pumping wheel, a stator wheel, an input shaft, an output shaft, a unidirectional clutch, and so forth. Of these component elements, the turbine wheel and the pumping wheel are both constructed with an outer shell, an inner core, and a plurality of blades or vanes fixedly secured between these two component members. While it is desirable from the standpoint of reduction in the manufacturing cost that these turbine wheel and pumping wheel be formed with a sheet metal, there inevitably arises, in this case, such a problem that fixing of the blade on the outer shell is particularly difficult. For example, when the blade and the outer shell are partially welded, there is caused a resistance in the flow of the fluid due to protrusion of beading into the inner surface of the outer shell, or distortion of the outer shell caused by welding, with the result that the function of the fluid coupling becomes impaired.

SUMMARY OF THE INVENTION

In view of the above-mentioned point of problem inherent in the known type of the hydrodynamic coupling device, it is an object of the present invention to provide an improved and effective device for fixing the blades or vanes to the inner surface of the outer shell of the turbine wheel for the fluid coupling.

It is another object of the present invention to provide an effective method of carrying out positioning and fixing of the blades by adopting a staking or caulking expedient.

According to the present invention, in one aspect thereof, there is provided a method for fixing a plurality of blades onto the inner peripheral surface of an outer shell of a turbine wheel for a fluid coupling made by sheet metal stamping, which comprises steps of: forming a plurality of slots, each having a size sufficient to receive in it a projection provided on each of the blades, in the inner concaved surface of the outer shell at an equal space interval provided between adjacent slots, and in an arrangement of a plurality of concentric rings; then inserting the projections provided on each blade in said plurality of slots in a manner to extend radially from the center of the concentric rings of the arrays of the slots; and staking one of the edge portions of said each slot to cause one of the side surfaces of said each projection of said blade to be press-contacted to the inner surface of said slot opposite to the staked inner surface of said slot.

According to the present invention, in another aspect thereof, there is provided an apparatus for fixing a plurality of blades to the inner surface of an outer shell of a turbine wheel for a fluid coupling made of a sheet metal which comprises, in combination: a die to hold an outer shell with the inner concaved surface thereof being faced upward; and array of punches in at least a single ring consisting of a plurality of punches, said array of punch in the ring shape being provided on said die in a manner movable up and down.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may be readily utilized as a basis for the designing of other structures for carrying out the several purposes of the present invention. It is important, therefore, that the claims be regarded as including such equivalent constructions as far as they do not depart from the true spirit and scope of the invention.

BRIEF DESCRIPTION OF THE ACCOMPANYING DRAWINGS

Specific embodiments of the present invention have been chosen for the purposes of illustration and description, and are shown in the accompanying drawings, forming a part of the specification, in which:

FIG. 1 is a longitudinal cross-sectional view, in part, of the fluid or hydrodynamic coupling provided with a turbine wheel made of a sheet metal;

FIG. 2 is a schematic diagram for explaining the process of forming the slot;

FIG. 3 is a plan view of a blade to be fitted on the inner surface of the turbine wheel;

FIG. 4a is a schematic diagram for explaining a process of staking or caulking the blade in the slot as formed;

FIG. 4b is also a schematic diagram for explaning another process of staking or caulking the blade in the slot as formed;

FIG. 16 is a perspective view, in part, showing a state of forming the slot by use of the punching press in its modified embodiment;

FIG. 17 is a perspective view, in part, showing a modified embodiment of the blade fixing device according to the present invention; and FIG. 18 is a longitudinal cross-sectional view, in part, showing a state of urging the blade from its top edge by means of an urging or keeping plate provided in the modified blade fixing device shown in FIG. 17.

DETAILED DESCRIPTION OF THE PREFERRED EMBODIMENTS

Figure 5:
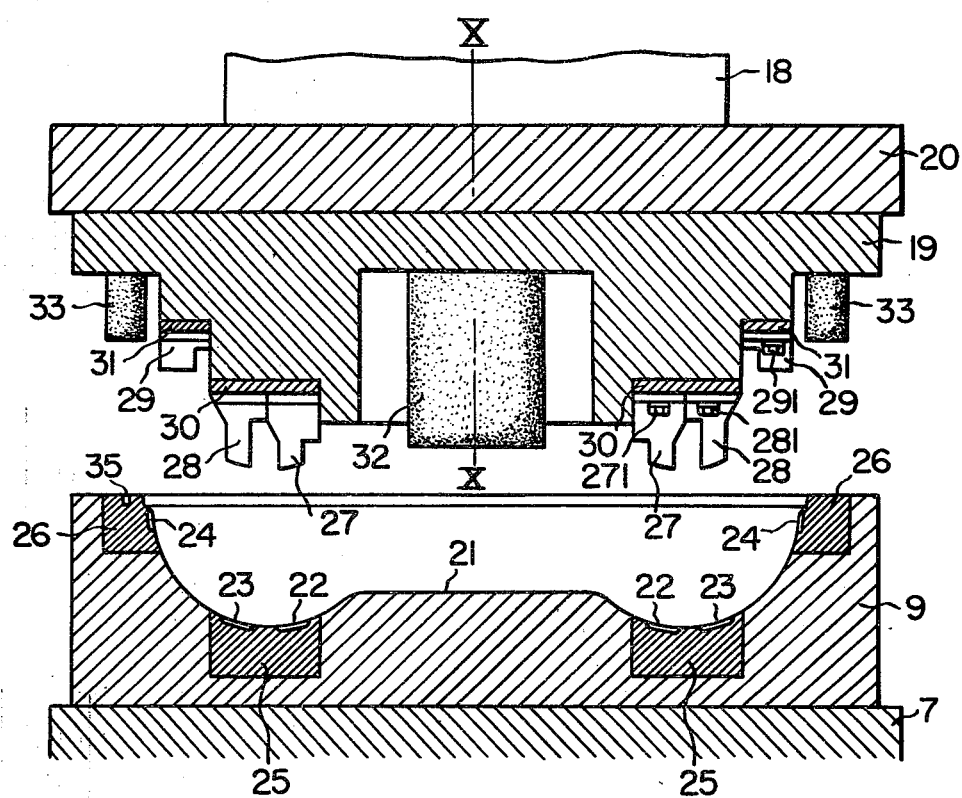
FIG. 5 is a front view in longitudinal cross-section of a blade fixing apparatus according to the present invention.

In the following, the present invention will be described in detail in reference to a few preferred embodiments shown in the accompanying drawings.

Referring first to FIG. 1, the fluid coupling is generally constructed with a turbine wheel 1, pumping wheel 2, a stator wheel 3, an input shaft 4, an output shaft 5, and a unidirectional clutch 6.

FIGS. 2, 3, and 4a illustrate the principle of the present invention. In FIG. 2, a die holder 7 fixedly supports on its top surface a die 9 having on one surface part thereof a concaved portion 8, and an outer shell 10 made of a sheet metal is held on the die 9. Opposite to this die 9 and on the same axis as the concaved portion 8, there is provided a punch 11 mounted on the ram of a press machine. The punch 11 is formed thicker than the thickness of the blade.

For the first step, the punch 11 is lowered toward the outer shell 10 to form a slot 13 in the concaved inner peripheral surface of the outer shell. For the second step, a projection 141 formed on one part of the outer periphery of the blade made by sheet metal stamping as shown in FIG. 3 is fitted in the slot 13. For the third step, another punch 15 which is set at a position off the punch 11 substantially for a thickness of the blade is lowered to stake one of the edge portions of the slot so that a projection 16 may come out of the edge portion as staked toward the inside of the slot, as shown in FIG. 4a, by which the blade 14 is urged to the inner side surface opposite to the part as staked. As the result, it is set at a determined position and firmly fixed in the slot.

Same operations as mentioned above are conducted with the other projections 142 and 143 of the blade 14 so as to fix it to the outer shell. Incidentally, a reference numeral 17 in FIG. 3 designates a projection for fitting the blade to an inner core 17 shown in FIG. 1.

The punch 11 or 15 is arranged in a plurality of numbers, and in at least a single circular arrangement or array along the outer periphery of the press machine, or in concentric arrangements in a plurality of rings.

The above-described slot forming process and staking process may be carried out by a separated individual device having the punch 11 or 15, which is mutually set at a position off for substantially the thickness of the blade, although it is also possible to carry out, after the slot forming step in the slot forming device to be described later, the staking process in utilization of the same slot forming punch by moving the punch or the outer shell in the circumferential direction for substantially the blade thickness. In this case, the downward stroke of the punch differs, as a matter of course, in each of the two machining processes. In case the slot forming process and the staking process are performed by a separate, individual device, there may be used a punch 151 of a thick gauge as shown in FIG. 4b, in which a corner part of the staking punch opposite to the blade is cut in slat to have an inclined surface 152 formed. When this type of punch is used, the mechanical strength of the punch itself increases, and, at the same time, the inclined surface 152 functions to urge the constituent material of the outer shell 10 toward the projection of the blade 141 to firmly press it with one inner side surface of the slot against the opposite inner surface thereof, whereby the gripping force of the blade by the inner side surface of the slot remarkably increases.

FIGS. 5 through 14 inclusive indicate a case, in which the slot forming process and the staking process are carried out in a single device.

Referring to FIG. 5, the die 9 is fixedly provided on a bolster of a press machine (not shown in the drawing) through the die holder 7. Under the ram 18 of the press machine, there is fixed a punch plate 19 having thereon a large number of punches through a punch holder 20. The punch plate 19 is so constructed that it may be rotated around the axial line X—X of the ram 18 with respect to the punch holder 20 for a distance substantially equal to the thickness of the plate to be fitted and staked by a mechanism which is omitted from illustration in the drawing. The abovementioned die holder 7 and the punch holder 20 are constructed in such a way that they may always maintain constant the center of their movement in the up and down direction by means of a guide post, not shown in the drawing.

Figure 7:
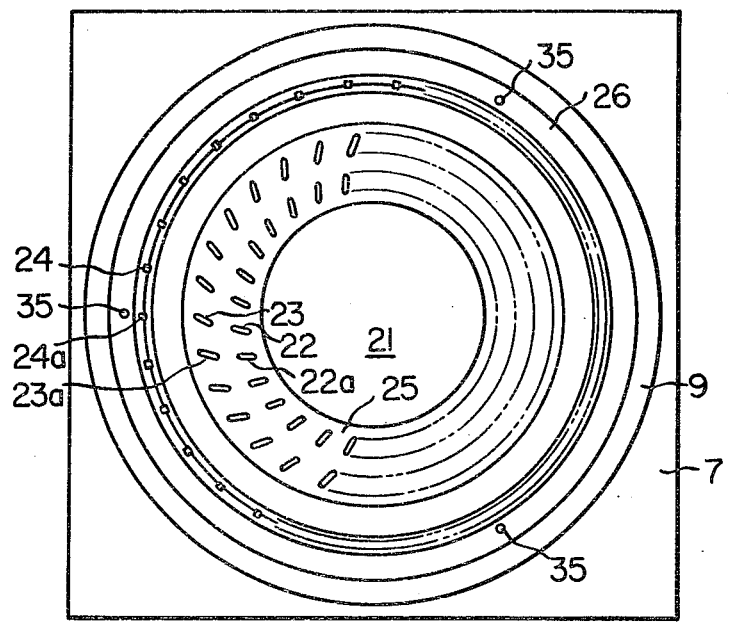
FIG. 7 is a plan view of a punching die.

The die 9 is formed therein with a recessed part 21, into which the outer shell 10 of the turbine wheel is fittingly accommodated. As shown in FIG. 7, a plurality of arrays of concaved molds 22, 23, and 24 for the slot forming are provided in the concaved bottom surface as well as in the upper peripheral surface of the recessed part 21 in such a manner that two arrays in concentric circular forms are at the bottom concaved surface of the recessed part 21, and a single array is at the upper peripheral surface of the recessed part 21. The adjacent slots in each array of the concaved molds 22, 23, and 24 as arranged concentrically in the recessed part are equal in their space interval. The concaved mold sections 22, 23, and 24 are made of a material having a hardness which is higher than that of the material in any other part of the die 9. Such materials 25 and 26 of higher hardness are in-laid in the relative portions of the die as shown in FIG. 5.

Figure 8:
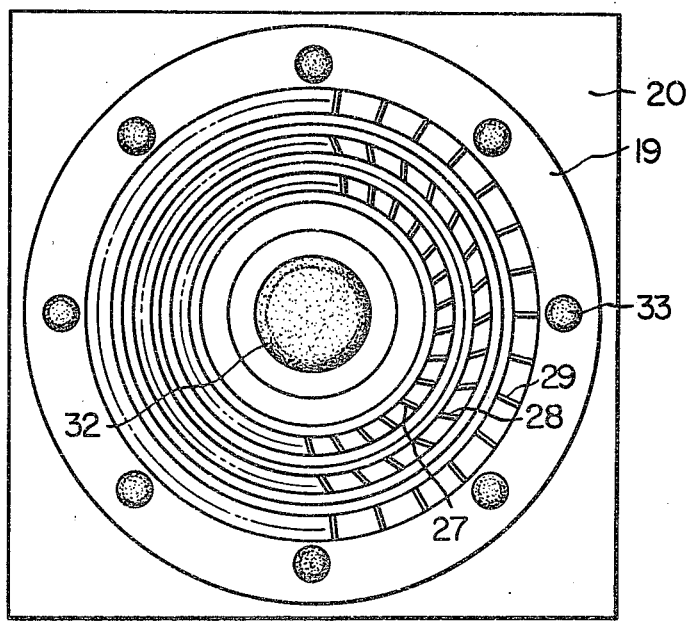
FIG. 8 is a plan view of a punching press, by which the fitting slots for the blades are formed.
Figure 9:
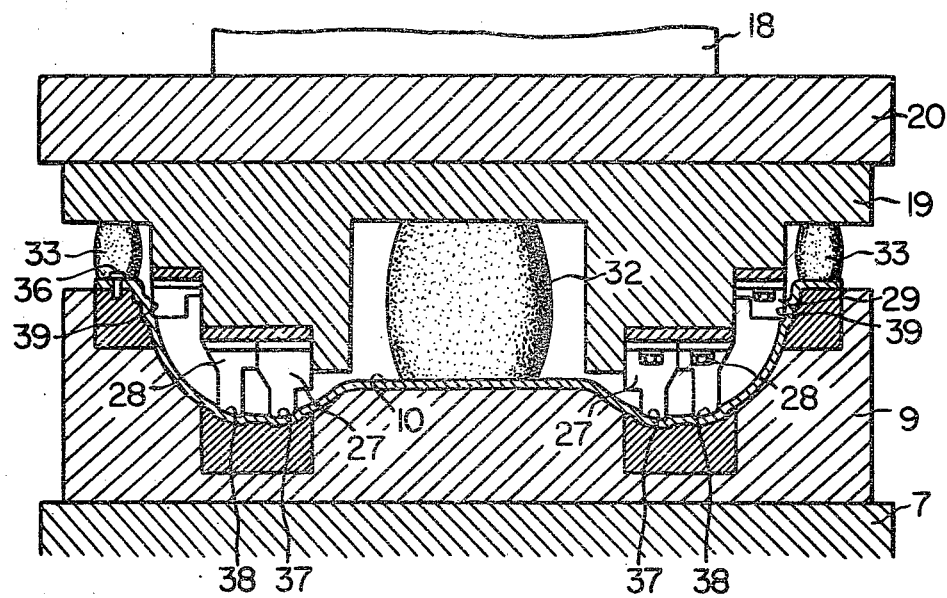
FIG. 9 is a front view in longitudinal cross-section showing a state of forming the slots in the outer shell of the turbine wheel.

Referring now to FIGS. 5 and 8, in which arrays of punches 27, 28, and 29 in three concentric rings are fixedly provided on the punch plate 19 by means of bolts 271, 281, and 291 in confrontation to the concaved molds 22, 23, and 24, respectively. The axial line of each punch is in parallel with the axial line X—X of the ram 18. It is to be noted in this connection that arrays of the punches in the concentric ring form are not necessarily a single and integral block, but an individual block of each array of such punches in ring form may be concentrically disposed around the axial line X—X and be fixed to the punch plate 19.

As shown in FIGS. 5 and 8, a single piece of spring 32 made of urethane rubber is fixed at the center of the punch plate 19, and a plurality of springs 33 made of the same material are fixed at an equal space interval on the peripheral part of the abovementioned punch plate 19. These rubber springs 32 and 33 serve to alleviate possible impact force to be caused to the outer shell 10 in the recessed part 21 of the die at the time of lowering the punches 27, 28, and 29, and to pressfix the outer shell 10 to the recessed part 21 of the die during the slot forming operation.

In the following, more detailed process steps for forming the slot in the outer shell and for fitting and staking the blades in the thus formed slots will be explained.

Figure 6:
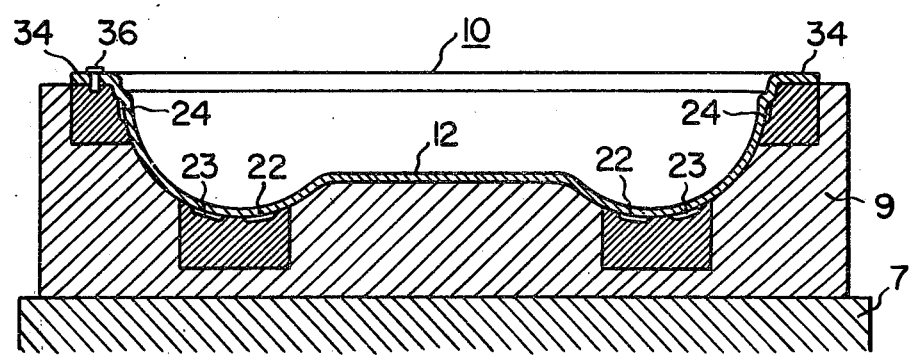
FIG. 6 is a front view in longitudinal cross-section showing a die, in which an outer shell of the turbine wheel is set.

(A) SLOT FORMING PROCESS STEPS (1) As shown in FIG. 6, the outer shell 10 which has been formed in advance in the form of a dish by press-forming of a sheet metal is fittingly accommodated in the recessed part 21 of the die 9 with its concaved surface 12 being faced upwardly, then a plurality of holes 23 perforated in the flanged part of the outer shell 10 are coincided with the corresponding number of holes 35 perforated in the upper brim of the die 9, and a pin 36 is inserted through these holes 34 and 35 to position and fasten the outer shell 10 to the die 9.

(2) The ram 18 is lowered to urge the center and the flanged parts of the outer shell 10 with the urethane rubber springs 32 and 33 to fix the outer shell to the die 9.

(3) The ram 18 is further lowered down to cause the two concentric rings of the punch arrays 27 and 28 to act on the bottom concaved surface of the outer shell 10, and to cause the single ring of the punch array 29 on the outer periphery to act on the boundary portion between the flanged part and the upper brim of the concaved outer shell, whereby three concentric rings of the arrays of the slots 37, 38, and 39 are simultaneously formed in each inner surface part of the outer shell 10.

(4) The ram 18 is finally raised upward upon completion of the slot formation.

Figure 10:
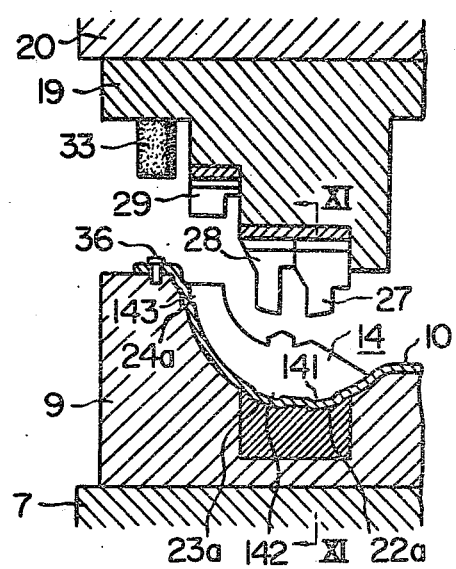
FIG. 10 is a front view in longitudinal cross-section of a part of the outer shell, in which the blade is snugly fixed in the slot.

(B) BLADE FITTING AND STAKING PROCESS STEPS (1) Three pieces of the projections 141, 142, and 143 provided on the blade made of a sheet metal are fitted into the corresponding three numbers of the slots 37, 38, and 39 which are substantially radially positioned as shown in FIG. 10, and which correspond in position to the concaved mold sections 22a, 23a, and 24a, respectively, as in FIG. 7. In the same manner as above, all the blades are fitted in the arrays of the slots in the concentric rings.

Figure 11:
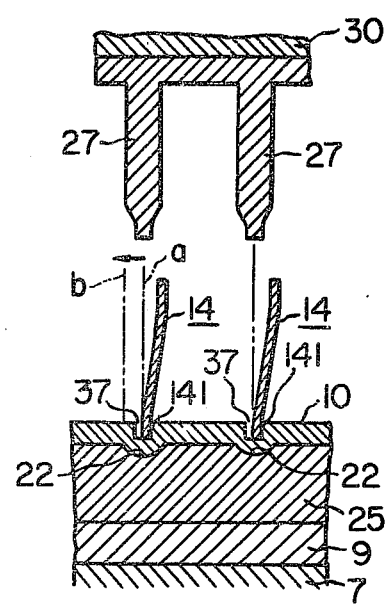
FIG. 11 is a enlarged cross-sectional view of the part shown in FIG. 10, taken along the line XI—XI.

(2) As shown in FIG. 11, the working position of the punches is changed by rotationally shifting the punch plate 19 in the direction of the arrow mark from its slot forming position a to the staking position b thereof.

Figure 12:
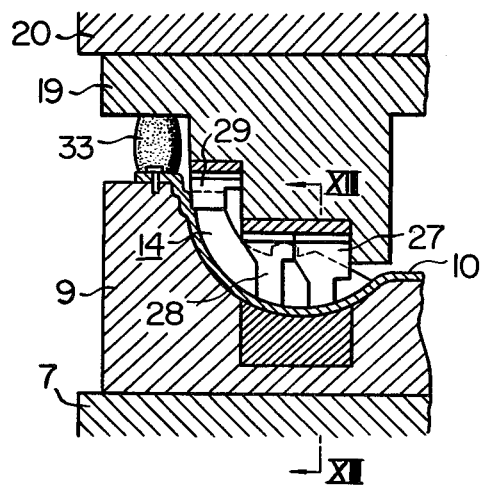
FIG. 12 is a front view in longitudinal cross-section of a part of the outer shell similar to that shown in FIG. 10, in which the staking or caulking process is being done to the blade as fitted in the slots.
Figure 13:
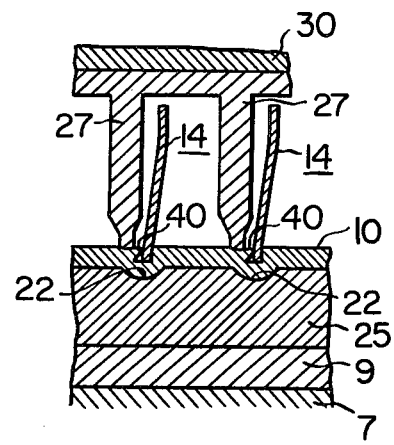
FIG. 13 is an enlarged cross-sectional view of the part shown in FIG. 12, taken along the line XIII—XIII.
Figure 14:
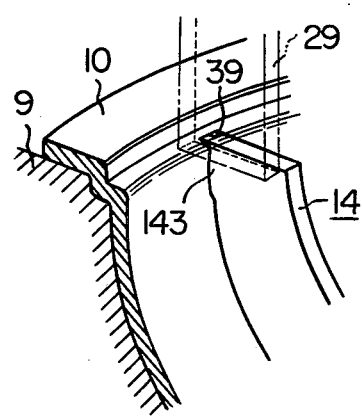
FIG. 14 is a perspective view, in part, showing a state of staking process conducted in the vicinity of the boundary part between the flange portion of the outer shell and the concaved surface thereof.

(3) Again, the ram 18 is lowered, and, as shown in FIGS. 12, 13, and 14, each group of the punches 27, 28, and 29 is acted onto one of the edge parts of the slots to cause it to protrude inwardly of the slot. By this inwardly protruded portion 40, each blade 14 is urged against the inside surface of the slot opposite to the staked side surface, whereby positioning and fixing of the blade are realized at the same time.

In the above-described staking step, it is also possible to change the working position of the punches either by turning the die itself, or by turning the outer shell alone with respect to the die. In case the slot is formed in the concaved portion as in the illustrated embodiment, when the outer shell alone is turned for the purpose of the staking, there is inevitably created a gap or clearance between the outer shell and the die due to the protruded portion at the bottom surface of the outer shell. Since, however, the pressure for the staking of the blade by the punch is smaller than that at the time of the slot forming, and the gap between the outer shell and the die is extremely small, there is no apprehension at all of the outer shell being deformed by the pressure for the staking operation.

The slot is not limited to the concaved groove as mentioned in the foregoing, but it may be formed by punching as shown in the turbine wheel 1 of FIG. 1. Also, the positioning of the outer shell with respect to the die may be done by a clamping metal.

As stated in the foregoing, when a plurality of slots for fitting the turbine blades are formed simultaneously in the concaved inner surface of the outer sheel by a plurality of concentric rings of punch arrays, positioning accuracy in the slots increases, which facilitates fitting work of the blades into them. In addition, the structure of the metal mold becomes simple. Further, when the slot forming punch is used also as the staking punch, the two operations can be carried out continuously with a single unit of press machine, in which the outer shell remains to be set in the die, which contributes to improvement in the machining efficiency. Moreover, since the staking process works on one and the same side of each blade at the same time, the uniform fixing and positioning of the blade can be done simultaneously. When the blade outlet angle is desired to be changed for altering capacity of the fluid coupling device owing to the engine characteristic, if the outermost punches are shifted in the circumferential direction for the required machining work, the blade outlet angle can be easily altered, hence the blade fixing apparatus of the present invention is excellent in its general purpose use.

Figure 15:
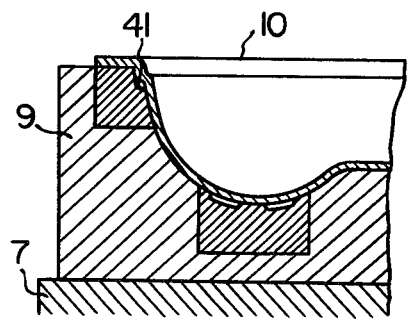
FIG. 15 is a longitudinal cross-sectional view showing a part of the die, in its modified embodiment.

Incidentally, it has become evident as the result of putting this blade fixing apparatus according to the present invention into practice that, in place of providing the concaved molds for the slots 24 at the outer peripheral part of the die, when a single ring-shaped inclined surface 41 is provided in the vicinity of its position as shown in FIG. 15, the outermost slots 39 can be formed in good shape. When the concaved molds 24a is replaced by the ring-shaped inclined surface 41 as in the above-described embodiment, if the blade outlet angle is to be altered, it is only sufficient that the position of the outermost array of the punches 29 in the ring shape alone be changed with the result that the working efficiency of the apparatus remarkably improves.

Furthermore, it has been discovered that, when an inclined cut-out or notched portion 291 is formed at the outer tip end corner of each punch 29, occurrence of the so-called "burrs" which protrude from the lower edge 391 of the slot 39 toward the concaved surface 12 of the outer shell in the slot forming operation can be prevented. The angle of inclination of the above mentioned notched portion should preferably be 45 degrees and larger. It goes without saying that this punching device can also be used for carrying out the staking operation of the blades fitted in the slots.

FIGS. 17 and 18 show a modified embodiment of the blade fixing apparatus according to the present invention, which is provided with a ring-shaped pressing plate 42 which serves to urge the blade 14 to the concaved inner surface of the outer shell 10.

The pressing or keeping plate 42 is held at the tip end of a rod 43 which hungs from the punch plate 19 in a freely slidable manner, and is positioned below the array of the punches 29 on the periphery of the outer shell. A plurality of compression coil springs 44 are provided between the punch plate 19 and the keeping plate 42 on the substantially same periphery of the above-mentioned ring-shaped array of the punches 29. A plurality of through-holes 45 are formed in the keeping plate 42 at positions corresponding to the peripheral ring-shaped array of the punches 29 so as to make them freely slidable through them at the time of the slot forming operation.

In so constructing the blade fixing apparatus according to the present invention as explained in the foregoing, each of the blades 14 are first held unmovably by the keeping plate 42 as shown in FIG. 17, and then the staking operation of the blades by the punches is carried out, whereby insufficient staking due to floating of the blades can be prevented.

What is claimed is:

1. An apparatus for fixing a plurality of blades onto the inner concaved surface of an outer shell with an axial center line of a turbine wheel for a fluid coupling made of sheet metal, comprising in combination: a die section having a recess to hold therein the inner concaved surface of the outer shell with the same being upwardly directed and having a plurality of concaved molds formed at an equal space interval therebetween and in ring form; a punch section having a plurality of punches in ring form to oppose said plurality of concave molds in said die section in a vertically movable manner and being orientated in a first position for forming slots in the inner concaved surface of the outer shell; and a blade keeping plate movable with said ring-shaped punches, wherein said concaved molds in said die section are formed in three concentric rings of the innermost, the intermediate, and the outermost or peripheral, said plurality of punches in array are made to oppose said respective rings of said concaved molds, said concaved mold and punches in each of the concentric rings are arranged mutually in parallel, wherein said punches are movable in a second position so that said blades as fitted in said concaved molds are staked at one side thereof along the radially extending longitudinal direction thereof from the axial center line, and each of said punches is notched at its outer tip end corner to the inner concaved surface of said outer shell.

2. The apparatus as claimed in claim 1, wherein said each punch is notched to have an angle of inclination of 45 degrees and larger at the outer tip end corner thereof.

* * * * *